Oct. 22, 1968

D. HEYER 3,406,577

OPERATOR MEANS FOR ROTARY ADJUSTOR SHAFTS

Original Filed May 11, 1964

INVENTOR.
DON HEYER
BY Paul A. Weilein
ATTORNEY

United States Patent Office 3,406,577
Patented Oct. 22, 1968

3,406,577
OPERATOR MEANS FOR ROTARY
ADJUSTOR SHAFTS
Don Heyer, 1019 N. Raymond,
Fullerton, Calif. 92631
Original application May 11, 1964, Ser. No. 366,350, now
Patent No. 3,287,988. Divided and this application
Apr. 25, 1966, Ser. No. 544,896
7 Claims. (Cl. 74—10.8)

ABSTRACT OF THE DISCLOSURE

Manually operable mechanism for rotating an adjusting shaft having a gear thereon, wherein one of a pair of pinions meshes with the gear while the other pinion meshes with said one pinion, these pinions being selectively movable by a manually operable knob having a frictionally clutched drive shaft which is connectable with the respective pinions, when the knob is shifted from one to the other, to reverse the driving direction effect by the knob with respect to said shaft. The adjusting shaft has a connected graduated dial for visibly indicating the angular rotative position of the adjusting shaft.

---

This application is a division of pending application for Letters Patent of the United States, Ser. No. 366,350, filed May 11, 1964, for Variable Speed Pulley-Belt Drive, now Patent No. 3,287,988.

The present invention relates to operator means for rotary adjustor shafts, or the like, wherein it is desired to effect angular or rotary adjustment of a shaft in a given sense and wherein it is also desired that the operator mechanism be selectively applicable to either of the opposite ends of an adjustor shaft.

In the above identified application for patent there is disclosed a pulley belt drive having an adjustor shaft, the rotation of which adjusts the input to output drive ratio of the drive mechanism. Such belt drive is illustrative of advantageous utility of the present invention.

An object of the present invention is to provide operator means for an adjustor shaft with which the operator means is engageable and such operator means being manually or otherwise operated to effect rotary adjustment of the adjustor shaft, the operator means, moreover, being adapted so as to be connected to either end of the adjustor shaft and being operable by rotation in the same direction, that is, for example, clockwise rotation of an operator member to effect adjustment in the same sense. In this connection, the operator means is provided with first and second gears, one engageable with a main adjustor gear, and the second engageable with the first gear, and the rotary member to be adjusted being selectively interengageable with either of the first or second gears.

As a further feature of the invention and within the purview of this objective, the operating means may conveniently be provided with indicator means for visually or otherwise indicating the ratio at which the mechanism is set, and as a novel feature of the invention the above noted main adjustor gear has on its face a relatively angularly adjustable indicator dial, which may be adjusted and fixed in selected adjusted positions in a very simple manner.

Other objects and advantages of the invention may be hereinafter described or will become apparent to those skilled in the art and the novel features of the invention will be defined in the appended claims.

In the accompanying drawings:

FIG. 3 is a horizontal sectional view as taken on the line 3—3 of FIG. 2;

Like reference characters in the several views of the drawings and in the following description designate corresponding parts.

Figure 1:
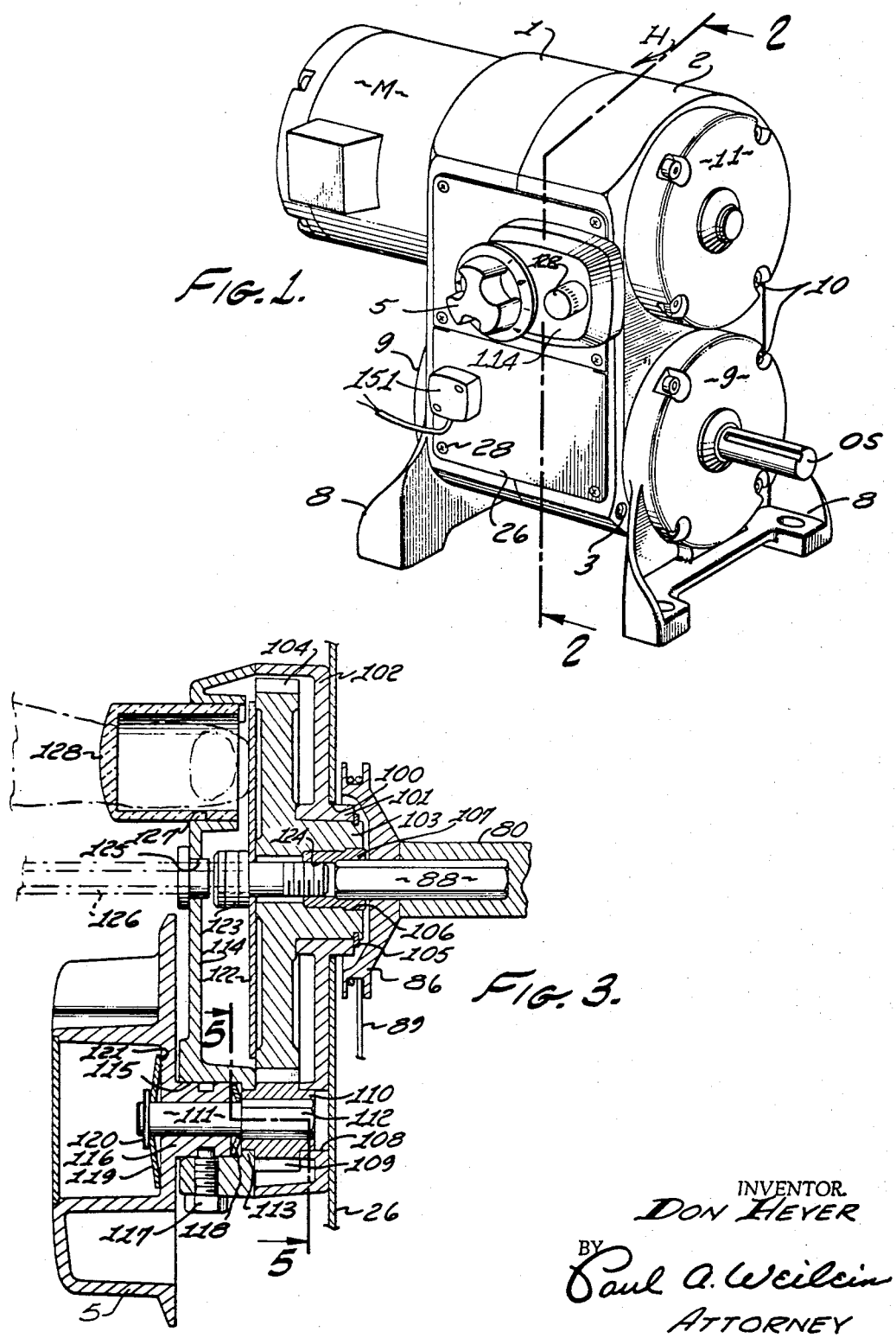
FIG. 1 is a view in perspective showing a variable pulley belt drive having the operator mechanism of the invention applied thereto.

Referring to FIG. 1, the present invention is shown as being applied to a variable pulley belt drive, the details of which are more particularly shown and described in the above identified pending application. Generally, however, the assembly comprises a housing H formed of a pair of half parts 1 and 2 secured together by through bolts 3 and having mounted on one side thereof a motor M which will transmit power through a variable pulley belt drive to an output shaft which in the illustrative embodiment is designated OS and extends from the housing H through the opposite side thereof from the motor M and in laterally spaced relation to the motor axis so that the assembly may be characterized as a Z drive. The drive ratio between the motor M and the output shaft OS may be varied by effecting adjustment through adjustor means operable by a control knob 5, and an indication of the selected ratio may be viewed visually through an eye piece 128 or may be transmitted as an electrical signal by means of a potentiometer 151.

The housing H may be supported upon legs 8 formed as a part of housing closure plates 9 which may be suitably secured as by fasteners 10 in selected orientations relative to the housing H so that the latter may assume a wide variety of positions.

Access openings in the housing H are closable by closure plates 25 and 26 adapted to be secured in place by fasteners 27 and 28, respectively, and inasmuch as the access openings open laterally with respect to the axes of the drive and driven pulley assemblies hereinafter to be described, service and maintenance of the assembly is facilitated and, in addition, certain advantages accrue as regards adjustment of the drive ratio by means of the operator mechanism of this invention.

Figure 2:
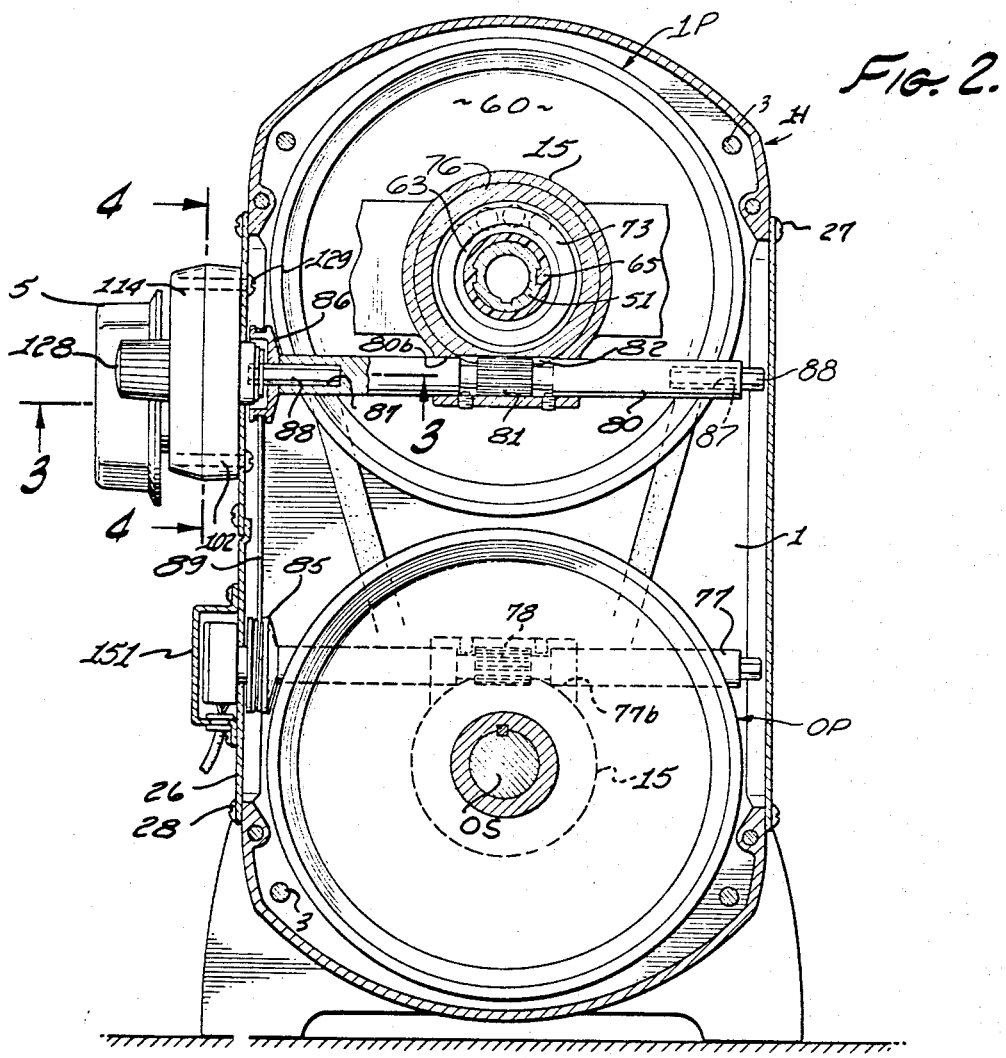
FIG. 2 is a vertical sectional view as taken on the line 2—2 of FIG. 1.

Referring to FIG. 2, it will be noted that the variable pulley belt drive contained within the housing comprises a pair of pulley assemblies respectively designated IP and OP, the pulley assembly IP being connected to the motor or input shaft and the pulley assembly OP being connected to the driven or output shaft OS.

The housing parts 1 and 2 in addition to having suitable bearing means in the plates 9 and 11 have an internal hub 15 which, in a manner particularly shown and described in the above noted pending application, supports mechanism for moving one section of the respective pulleys axially toward and away from the other pulley section. This means, as shown in respect of the input pulley assembly IP, includes a collar 76 disposed within the hub 15 and adapted to be moved axially to effect corresponding axial movement of the movable pulley section 60 through a thrust bearing 73 and a bearing support 65 which is keyed to the shaft 51. Axial movement of the sleeve 76 is effected in the input pulley assembly IP by a rotary adjustor shaft 80 and in the output pulley assembly OP by a rotary adjustor shaft 77. These adjustor shafts, by means of a cable 89 and sheaves 85 and 86, are adapted to rotate in unison. Shaft 77 has a pinion 78 while shaft 80 has a pinion 81. The pinions are disposed in bores 77b and 80b, respectively, which extends tangentially of the hubs 15 and the pinions engage a rack such as that shown at 82 in the input pulley assembly IP so as to effect axial movement of the sleeve 76 upon rotation of the adjustor shaft.

The foregoing is by way of illustration of an advantageous utility of the present operating means for a rotary adjustor shaft and, indeed, shaft 80 may be operatively connected to any suitable member to be adjusted in any desired assembly other than a variable speed drive of the type generally described above.

It will be noted that the shaft 80 at each of its ends is provided with a polygonal socket 87 adapted to receive a polygonal drive pin 88. At the left hand end of the shaft 80 the polygonal drive pin extends through the sheave 86 so as to effect rotation of the latter and also the drive pin 88 extends into the operating means of the present invention whereby rotation of the knob 5 will cause rotation of the shaft 80.

With reference to FIG. 3, it will be noted that the closure plate 26 which overlies the access opening in one side of the machine is provided with an opening 100 in which a cylindrical supporting bushing 101 formed as a part of a housing base 102 is disposed. Rotatively journalled in the bushing 101 is a hub 103 of large adjustor gear 104, a snap ring 105 engaging in the hub and with an end of the bushing securing the gear against axial displacement.

Suitably installed in an axial bore 106 in the gear hub 103 is a drive element 107 having in one end an extremity of the hexagonal drive element 88 previously referred to, whereby rotation of the gear 104 will be transmitted to the adjustor shaft 80. Laterally spaced from the bushing 101, the housing base 102 is provided with a further integral bushing 108 in which seats one end of the hub 110 of a pinion 109. This pinion 109 is in mesh with the gear 104 and is adapted to be driven by a shaft 111 having a hexagonal drive portion 112 fitting in a corresponding opening in the hub 110. Pinion 109 is retained in the bushing 108 by means of a flange 113 formed on an outer section of an outer adjustor housing section 114, this housing section having a bore 115 in which a hollow stem 116 on the knob 5 is rotatably disposed, the latter being retained in the opening by means of a retainer screw 117. Upon releasing the screw 117, it will be apparent that the knob 5 and associated shaft 111 may be detached as a unit by movement to the left, as viewed in FIG. 3, and the driving portion 112 disengaged from the pinion hub 110.

The pinion shaft 111 rotatably extends through the hollow knob stem 116 and a friction clutch drive means is provided for effecting rotation of the pinion with the knob 5. Such friction clutch drive means may preferably comprise a Belleville washer 118 abutting at its inner periphery with the pinion and at its outer periphery with the inner extremity of the knob stem 116, and an opposing Belleville washer 119 engaging at its inner periphery with a retainer ring 120 on the outer extremity of pinion shaft 111 and at its outer periphery with a wall 121 provided on the knob 5. By virtue of this friction drive connection, the entire adjustor drive mechanism cannot be forced by rotation of the knob 5 to exert a greater rotary force on shaft 80 than is desired.

Means are also provided for visually indicating the selected position of shaft 80 and, consequently, the selected input to output ratio in the case of the variable drive herein disclosed. Such means comprises a graduated dial 122 in the form of a plate or disc adjustably mounted upon the large adjustor gear 104 and adapted to be retained in selected positions of orientation relative to the gear 104 by means of a cap screw 123 which engages the dial 122 and has a threaded stem engaged in a threaded recess 124 in the outer end of the drive element 107. Access to the cap screw 123 is afforded through an opening 125 in the adjustor housing cover 114, the opening being adapted to receive the working end of a tool 126 shown in broken lines with which the cap screw 123 may be loosened to enable manual orientation of the dial 122 relative to the gear 104.

In this connection, the housing cover 114 has an opening 127 located adjacent the outer periphery of the dial 122 through which an operator's finger, as shown in broken lines, may be inserted to engage and cause rotation of the dial 122 relative to the gear 104. In order to assist in the visual observation of the selected position of gear 104 as indicated by the dial 122, a magnifying sight member 128 may be removably fitted in the opening 127, thereby rendering more clearly visible the indicia or graduations upon the dial 122.

Figure 4:
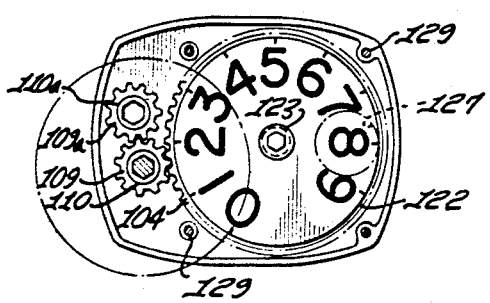
FIG. 4 is a vertical sectional view as taken on the line 4—4 of FIG. 2.

The adjustor housing base and cover 102 and 114, as shown in FIG. 4, are secured together by means of a suitable number of fasteners 129 and, as seen in FIG. 2, at least a pair of such fasteners 129 extend also through the closure plate 26 to fix the case upon the plate 26.

In accordance with one of the objectives of the invention, the adjustor mechanism just described is very flexible and may be mounted either as shown at an end of the adjustor shaft 80 at one side of the machine, or, if preferred, the adjustor mechanism contained within the housing 102, 114 may also be installed in driving engagement with the opposite end of the shaft 80 or, if preferred, with an end of the shaft 77, thereby substantially facilitating adaptation of the assembly to various installations.

Figure 5:
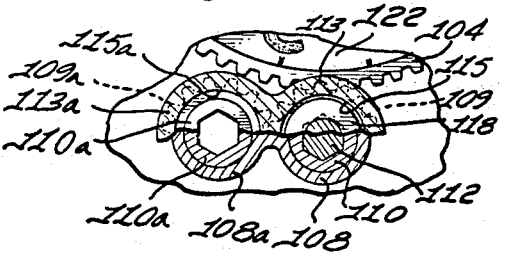
FIG. 5 is a fragmentary vertical sectional view as taken on the line 5—5 of FIG. 3.

As seen in FIGS. 4 and 5, in order to enable clockwise rotation of the adjustor knob 5 to effect corresponding clockwise rotation of the shaft with which it is drivingly engaged, as for example if the knob and pinion-gear assembly is mounted at the opposite end of shaft 80 from that shown in FIG. 2, provision is made for reversing the driving effect of the knob 5 with respect to the gear 104. For such purpose the housing base 102 is provided with bushing means 108a for supporting a second pinion 109a in mesh with the pinion 109. As shown in FIG. 4, the pinion 109a, as in the case of pinion 109, has a hub 110a with an opening adapted to similarly receive the drive portion 112 of pinion shaft 111, whereby the pinion 109 then becomes an idler which will cause the large gear 104 to rotate clockwise upon clockwise rotation of the knob 5. The housing section 113 as shown in FIG. 4 also has a bore 115a, similar to bore 115, in alignment with the bushing 108a whereby the knob stem 116 may be disposed selectively in either of the bores 115 or 115a depending upon which of the pinions 109, 109a is to be employed.

While specific structural details have been shown and described, it should be understood that changes and alterations may be resorted to without departing from the spirit of the invention as defined in the appended claims.

I claim:

1. Operator means for a rotary driven member, comprising a support, a gear on said support, a pinion engaged with said gear, a second pinion engaged with said first pinion, an operator member, and means for selectively connecting said operator member to either of said pinions.

2. Operator means as defined in claim 1, wherein said support is provided with a pair of laterally spaced mounting means for said operator member and said means for selectively connecting said operator member to either of said pinions being operable when said operator member is mounted in either of said mounting means.

3. Operator means as defined in claim 1, wherein slip clutch means is interposed between said operator member and said gear.

4. Operator means as defined in claim 1, including means for indicating the position of said gear including a dial on said gear.

5. Operator means for a rotary driven member, comprising a housing, a gear mounted in said housing and having drive means for connection to said rotary member, a pair of spaced pinions mounted in said housing, one of said pinions being in engagement with said gear, the other of said pinions being engaged with said one pinion, an operator member, and means for supporting said operator member in driving engagement with either of said pinions.

6. In an adjustor mechanism including a driven gear and operator means for rotating said gear, a dial, means mounting said dial on said gear comprising a fastener threaded in said gear and engageable with said dial, a housing about said gear, an opening in said housing aligned with said fastener for accommodating a tool, and a sight opening in said housing adjacent a portion of said dial.

7. An adjustor mechanism as defined in claim 6, including magnifier means removably disposed in said sight opening.

References Cited

UNITED STATES PATENTS

| | | | |
|---|---|---|---|
| 1,971,724 | 8/1934 | Mathieu | 74—352 |
| 2,431,149 | 11/1947 | Sylvander | 74—354 |
| 2,662,417 | 12/1953 | Mascherpa | 74—352 |
| 2,854,855 | 11/1958 | Dudley | 74—352 |
| 2,978,201 | 4/1961 | Polevoy | 74—352 |
| 3,111,858 | 11/1963 | Coutant | 74—230.17 |
| 3,150,527 | 9/1964 | Trandel | 74—218 |
| 3,250,141 | 5/1966 | Luenberger | 74—230.17 |

FOREIGN PATENTS

| | | |
|---|---|---|
| 579,418 | 10/1924 | France. |

FRED C. MATTERN, JR., *Primary Examiner.*

W. S. RATLIFF, *Assistant Examiner.*